March 29, 1938.  F. W. WEST  2,112,798
MEAT TENDERER
Filed Feb. 11, 1936  2 Sheets-Sheet 1
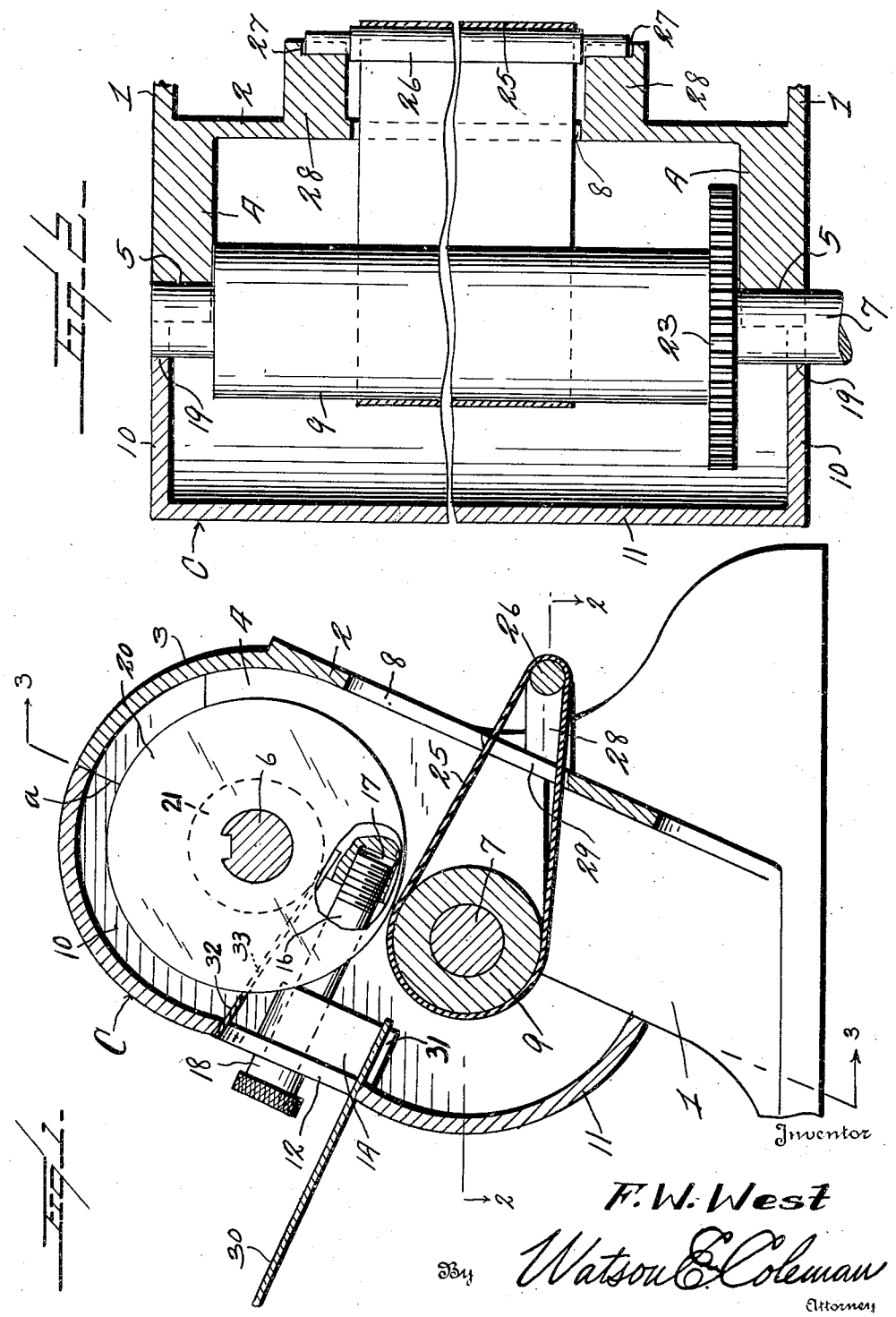
Inventor
F. W. West
By Watson E. Coleman
Attorney

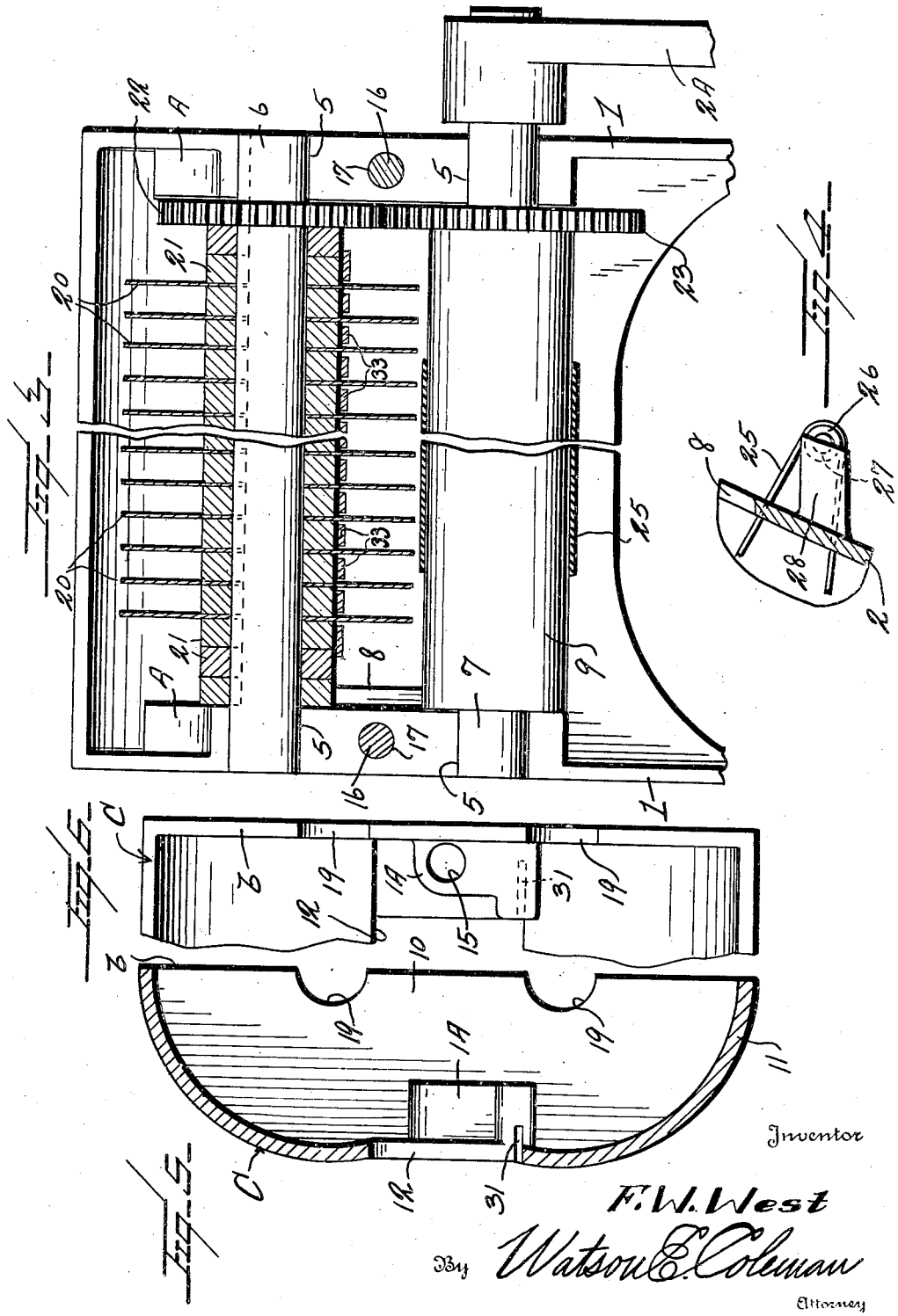

Patented Mar. 29, 1938

2,112,798

UNITED STATES PATENT OFFICE 2,112,798

MEAT TENDERER

Frank W. West, Bellefonte, Pa.

Application February 11, 1936, Serial No. 63,439

7 Claims. (Cl. 17—27)

This invention relates to a meat tenderer, and it is an object of the invention to provide a device of this kind having a pair of rollers between which a slice of meat is adapted to be passed and wherein means is provided to assure the slice passing between the rollers in substantially a straight line.

Another object of the invention is to provide a device of this kind comprising two rollers at least one of which has processing elements together with a force feed for the meat slice after it passes between the rollers to assure the slice travelling in substantially a straight line irrespective of any gristle, fat or other obstructions carried by or comprised in the slice.

Furthermore, it is an object of the invention to provide a device of this kind comprising two rollers between which a slice of meat is adapted to pass together with an endless conveyor driven by one of the rollers for positively carrying the slice out from the machine.

The invention consists in the details of construction and in the combination and arrangement of the several parts of my improved meat tenderer whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a vertical sectional view taken through a machine constructed in accordance with an embodiment of my invention;

Figure 2 is a horizontal sectional view taken substantially on the line 2—2 of Figure 1;

Figure 3 is a vertical sectional view taken substantially on the line 3—3 of Figure 1;

Figure 4 is a fragmentary view partly in section and partly in elevation illustrating one of the bearing lugs for the outboard roller for the apron or conveyor;

Figure 5 is a sectional view taken transversely through the cap member herein comprised unapplied.

Figure 6 is a fragmentary view in rear elevation of an end portion of the cap member.

In the accompanying drawings is illustrated an embodiment of my invention wherein the device or machine comprises two side plates 1 of desired height and having the major portion of the forward edge of each of such plates 1 straight and disposed on an inward and upward angle with respect to the vertical of approximately thirty degrees as shown by the line 3—3 although I do not wish to be understood as limiting myself to this particular angle.

The upper portions of the plates 1 are connected by a back plate 2 spaced a desired distance from the straight front edges a of the side plates and substantially parallel therewith. The upper marginal portion of this back plate 2 has an extension 3 disposed on an upward and forward curvature with the outer or upper longitudinal margin of this extension 3 terminating flush with the straight edges a.

The side plates 1 have their central portions 4 of increased thickness in a direction beyond the inner faces thereof, and the outer or straight edges of the portions 4 at desired points spaced therealong are provided thereacross with the substantially semi-circular bearing grooves 5 which receive the end portions of the parallel shafts 6 and 7.

The back plate 2 is provided thereacross with a discharge or delivery opening 8. This opening is of a material height to substantially bridge the space between the shafts 6 and 7 and extending below the lowermost shaft 7 and the drum or roller 9 mounted on said shaft for rotation therewith.

The side plates 1 together with the back plate 2 and the extension 3 form the rear portion of a housing. The housing is completed by a front section C having a front wall 11 and end heads 10 attached thereto and closing the ends of the front section, the inner edges b, as shown in Fig. 5, being straight and abutting against the confronting end edges a of the rear section. The front wall 11 and the heads 10 are preferably integrally formed.

The central portion of the plate 11 is provided with a receiving or feeding opening 12 of a length substantially equal to the length of the discharge or delivery opening 8 hereinbefore referred to. The plate 11 between each end of the opening 12 and the adjacent head 10 is provided with an enlarged portion 14 having therethrough an opening 15. Freely insertible through this opening 15 is the shank of a screw 16, the end portion of which is threaded within a socket 17 provided in an opposed enlarged portion 4 of the rear housing section when the cap member C is in applied position. The outer extremity of the shank 16 carries a head 18 for engaging against the outer face of the adjacent portion of the plate 11 whereby the closure member C may be effectively clamped in applied or working position.

The straight edge b of each of the end heads 10 of the closure member is provided with the suitably spaced bearing recesses 19 which engage over the end portions of the shafts 6 and 7 within the gearing grooves 5. The cap member C when applied serves, therefore, to effectively maintain the shafts 6 and 7 in place. It is to be understood from the foregoing that when the cap member C is applied the straight edges b thereof will have close contact with the straight edges a of the plates 1.

The shaft 6 has mounted thereon for rotation therewith a series of processing disks 20 of a radius such as to cause the peripheries of the disks to closely approximate the surface of the drum or roller 9 of the shaft 7. These disks 20, as particularly illustrated in Figure 3, are equidistantly spaced along the shaft 6 and are maintained in desired spaced relation by the spacing washers or members 21 surrounding the shaft.

One end portion of the shaft 6 has fixed thereto a gear wheel 22 which meshes with a gear wheel 23 fixed to the adjacent end portion of the shaft 7. The ratio of these gears 22 and 23 is such that the shaft 6 rotates at a greater speed than the shaft 7. The shaft 7 is of a length to extend outwardly beyond one of the end plates 1 to permit the attachment to said shaft of a suitable operating member herein disclosed as a hand crank 24. Obviously, other means can be employed to effect the desired rotation.

The periphery of the drum or roller 9 is smooth and unobstructed and disposed around this drum or roller 9 is an endless web conveyor 25 preferably of a rubber compound or other suitable material. This conveyor 25 extends rearwardly and out through the lower portion of the discharge or delivery opening 8. The outer portion of the conveyor 25 passes over a shaft 26 preferably of a diameter materially less than the diameter of the drum or roller 9 so that the upper or carrying off stretch of the conveyor will be disposed at downward inclination. The shaft 26 is of a length in excess of the width of the conveyor 25 and the extremities of this shaft 26 are freely received within bearing recesses 27 provided in the outer end faces of the bearing lugs 28. These lugs 28 extend outwardly and rearwardly from the back plate 2 adjacent the opposite ends of the opening or slot 8. Each of these recesses 27 is substantially semi-circular in cross section so that the shaft 26 may readily rotate when the conveyor or apron 25 is in motion. It is also to be particularly pointed out that the elasticity of the apron or conveyor 25 provides for sufficient retraction of said conveyor, to hold the end portions of the shaft 26 in engagement with the bearing grooves or recesses 27. It is also to be noted that the outer ends of these grooves or recesses are closed, thus holding the shaft 26 against undue endwise movement.

While the discharge or delivery opening 8 extends substantially from between the side plates 1 of the device or machine, it is to be stated that the middle portion of this opening or slot is of increased width downwardly, as at 29. As is illustrated in Figure 1 it is through this increased portion 29 that the conveyor 25 passes.

In order to direct the meat slice into the passage between the drum or roller 9 and the processing disks 20, a feed table 30 is provided. This table when applied is disposed on a downward incline through the opening 12 in the section C and has a portion inserted or extended a slight distance beyond the wall of opening 12, said inserted portion is received within a groove 31 provided in each of the enlarged portions 14 immediately adjacent the lower margin of the opening 12.

As a meat slice is passed through the machine the disks 20 penetrate the slice a distance sufficient to bring the juices and sweetness of the meat to the surface and to break apart the sinews thus assuring the slice when delivered being tender and palatable and in the best possible condition for cooking.

As the meat slice passes between the drum or roller 9 and the disks 20 it is positively carried out through the discharge or delivery opening by the upper stretch of the conveyor 25. This is of particular advantage as it assures the meat slice running through the machine in a straight line regardless of gristle, fat or other obstructions in the meat.

In order to assure proper delivery of the meat slice or steak to the disks 20 and the associated spacer members or washers 21 as said slice or steak passes into the machine and prevent the slices from accidentally curling upward over the disks 20, I provide a comb plate 32 suitably secured to the upper edge of the receiving or feeding opening 12. The teeth 33 of this plate extend inwardly from the cap member C and are of a length to contact from below with the peripheries of the members or washers 21. These teeth 33 possess a certain degree of inherent resiliency to assure the requisite contact of the teeth with the washer or members 21.

From the foregoing description it is thought to be obvious that a meat tenderer constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A device of the class described comprising a housing having a discharge opening, lugs projecting rearwardly from the housing adjacent the opposite ends of the discharge opening, substantially vertically spaced rotatable members within the housing, penetrating means carried by the upper member, a shaft freely engaged with the outer portions of the lugs, and a carry off endless conveyor disposed around the lower rotatable member and the shaft, said conveyor being elastic and under tension when in working position to cause the conveyor to maintain the shaft in working engagement with the lugs.

2. A machine of the class described comprising a housing having a feeding opening in one wall and a discharge opening in a second wall, substantially vertically spaced rotating members mounted within the housing, the product to be treated passing into the housing through the receiving opening and passing between the rotating members and out through the discharge opening, processing elements carried by the upper rotating member and spaced apart lengthwise thereof, a guiding member secured to the upper edge portion of the receiving opening having fingers contacting with the upper rotating member between the processing elements, and a carry off endless conveyor leading from the lower rotating member out through the discharge opening and driven by said lower rotating member.

3. A meat tenderer, including a housing having a feed opening and a discharge opening, an upper shaft disposed within the housing and carrying a plurality of spaced radially extending relatively thin penetrating elements, a lower shaft having a roller fixed thereon, intermeshing gears on said shafts, one of said shafts constituting a driving shaft, a transversely flat conveyor passing around the roller of the lower shaft, and a rear shaft supported by but disposed exteriorly of the housing and outward of the delivery opening of the housing and around which the conveyor passes, the penetrating elements having their outer edges closely approximating the conveyor.

4. A meat tenderer, including a housing having a feed opening and a delivery opening, an upper shaft disposed within the housing and carrying a plurality of spaced penetrating elements, a lower shaft extending parallel to the upper shaft and having a roller fixed thereon, intermeshing gears on said shafts, the gears being of such diameter as to cause the upper shaft to rotate at a slower rate than the lower shaft, one of said shafts constituting a driving shaft, a conveyor passing around the lower shaft, and a shaft for the conveyor supported by the housing but disposed outward of the delivery opening of the housing and around which the conveyor passes, the penetrating elements having their outer edges approximating the conveyor.

5. A meat tenderer, including a housing having a feed opening and a delivery opening, an upper shaft carrying a plurality of annular thin knives spaced from each other and mounted directly on and for rotation with the upper shaft, a lower shaft carrying a roller, means for rotating the upper shaft at a speed less than the speed of rotation of the lower shaft, an endless conveyor passing around the lower shaft and having a relatively soft surface confronting and closely approximating said annular knives, and a rear conveyor shaft mounted upon the housing and disposed outward of the delivery opening thereof and around which the conveyor passes.

6. A meat tenderer, including a housing having a feed opening and a delivery opening, an upper shaft disposed within the housing and carrying a plurality of laterally spaced penetrating elements, a lower shaft within the housing parallel to the first named shaft and carrying a roller, intermeshing gears on the two shafts, said gears being so proportioned that the upper shaft rotates at a less speed than the lower shaft, bearings carried by the housing and disposed outward of the discharge opening of the housing, an elastic belt conveyor extending around the roller, and a shaft carried in said bearings and around which the discharge end of the conveyor passes, the bearings for the last named shaft being open and the elasticity of the conveyor holding said last named shaft in place in said bearings.

7. A meat tenderer including a housing having a feed opening and a delivery opening, an upper shaft extending through the housing and carrying a plurality of laterally spaced penetrating elements, a lower shaft extending through the housing parallel to the first named shaft and carrying a roller, means affording a driving connection between the two shafts, said means causing the upper shaft to rotate at a less speed than the lower shaft, bearings carried by the housing and disposed outward of the discharge opening of the housing, a roller in said bearings, an elastic belt conveyor extending around said rollers, the outer surface of the conveyor being disposed closely adjacent to the peripheral edges of the penetrating elements, and a shaft carried in said bearings and around which the discharge end of the conveyor passes.

FRANK W. WEST.